US006215867B1

(12) United States Patent
Eslambolchi

(10) Patent No.: US 6,215,867 B1
(45) Date of Patent: *Apr. 10, 2001

(54) TELECOMMUNICATIONS NETWORK ARCHITECTURE WITH RAPID RESTORATION

(75) Inventor: Hossein Eslambolchi, Basking Ridge, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,849

(22) Filed: Jun. 20, 1997

(51) Int. Cl.[7] .................................................. H04M 7/00
(52) U.S. Cl. ............................ 379/229; 379/26; 379/221
(58) Field of Search ................................ 379/220, 221, 379/219, 279, 229, 230, 207, 22, 26; 370/228, 221, 238

(56) References Cited

U.S. PATENT DOCUMENTS

| | | | | |
|---|---|---|---|---|
| 5,058,105 | * | 10/1991 | Mansour et al. | 379/221 |
| 5,146,452 | * | 9/1992 | Pekarske | 379/221 |
| 5,182,744 | | 1/1993 | Askew et al. | 370/16 |
| 5,367,562 | * | 11/1994 | Tourbah et al. | 379/26 |
| 5,420,917 | | 5/1995 | Guzman | 379/279 |
| 5,459,716 | * | 10/1995 | Fahim et al. | 370/228 |
| 5,463,615 | * | 10/1995 | Steinhorn | 379/221 |
| 5,465,294 | * | 11/1995 | Chapman, Jr. et al. | 379/221 |
| 5,680,326 | * | 10/1997 | Russ et al. | 395/500 |
| 5,832,196 | * | 11/1998 | Croslin et al. | 379/221 |
| 5,848,145 | * | 12/1998 | Gallagher et al. | 379/207 |
| 5,850,505 | * | 12/1998 | Grover et al. | 379/221 |
| 6,018,576 | * | 1/2000 | Croslin | 379/221 |

OTHER PUBLICATIONS

FASTAR (sm)—A Robust System for Fast DS3 Restoration, C–W Chao, P.M. Dollard, J.E. Weythman, L.T. Nguyen, H. Eslambolchi, GLOBECOM '91, pp. 1396–1400, Dec. 1991.
FASTAR (sm) Operations in the Real AT&T Transport Network, H.S. Burns, C–W Chao, P.M. Dollard, R.E. Mallon, H. Eslambolchi, P.A. Wolfmeyer, GLOBECOM, pp. 229–233.

* cited by examiner

Primary Examiner—Ahmad Matar
Assistant Examiner—Benny Q. Tieu
(74) Attorney, Agent, or Firm—Robert B. Levy

(57) ABSTRACT

A network (10) having an enhanced restoration architecture includes at least two Digital Access Cross-Connect Systems (DACS) 20 having the ability to uniquely identify a signal. When a restoration route is established in the network following a failure, the DACS situated at an origin and destination nodes of restoration route will launch and recover, the particularly identified signal provided continuity exists on the route. In this way, the DACS can automatically determine the continuity of the restoration route without the need to separately perform time-consuming continuity tests of the individual paths comprising the restoration route.

11 Claims, 2 Drawing Sheets

TELECOMMUNICATIONS NETWORK ARCHITECTURE WITH RAPID RESTORATION

TECHNICAL FIELD

This invention relates to a technique for providing an alternate signal path in a communications network upon failure of a network link.

BACKGROUND ART

Present day telecommunications carriers, such AT&T, carry large volumes of telecommunications traffic across their networks. While most carriers strive for high reliability, disruptions in their networks can and do occur. Such disruptions are often attributable to a failure in a link between two network nodes, each node typically comprising a telephone central office or network control center. The links, which may each take the form of a copper cable, optical fiber or a radio channel, may fail because of an act of nature, such as a flood, ice storm, hurricane or other weather-related occurrence. Link failures are sometimes man-made. Not infrequently, a contractor may accidentally sever a cable or fiber link during excavation along the link right-of way.

Regardless of the manner in which a communication link is severed, a link failure invariably disrupts communications services. For example, the loss of a single fiber in an optical cable usually results in many blocked calls. Each blocked call represents a loss of revenue for the carrier carrying that call. Thus, rapid restoration of traffic is critical. Typically, telecommunications carriers achieve traffic restoration by routing traffic on alternate routes. Since spare capacity often exists on many routes, traffic restoration is a matter of determining where such spare capacity exists and then establishing a path utilizing such spare capacity to bypass the severed link.

U.S. Pat. No. 5,182,744, "Telecommunications Network Restoration Architecture," issued on Jan. 26, 1993, in the name of James Askew et al. and assigned to AT&T (incorporated by reference herein) discloses a restoration technique for routing telecommunications traffic on an alternate route in the event of a severed communications link. The Askew et al. technique utilizes communications monitors at the nodes to detect the disruption of traffic across the communications links. Should a disruption occur because of a failed link, the monitor at one or both of the affected nodes notifies a central facility that determines an alternate route over which the traffic can bypass the failed link. After finding a restoration route, the central facility directs the nodes to conduct a continuity test of the restoration route. Upon successful completion of the continuity test, the disrupted traffic passes over the restoration route.

While the Askew et al. restoration technique represents a significant advance over past approaches, the continuity test performed prior to restoration is not instantaneous. At present, restoration of one hundred DS3 signals takes about five minutes. Even though such an interval may seem insignificant, as many as 50,000 calls may be blocked during this time. Thus, there is a need for a technique achieves network restoration quickly, to reduce the incidence of blocked calls.

BRIEF SUMMARY OF THE INVENTION

Briefly, in accordance with a preferred embodiment of the invention, a technique is provided for restoring traffic within a telecommunications network upon the failure of a link coupling a pair of nodes. In accordance with the restoration technique of the invention, the links are monitored to determine a possible link failure. The failure of any link is reported to a central facility, typically, although not necessarily, by wireless communication. Upon receipt of a report of a failed link, the central facility determines a restoration route. In practice, the restoration route is determined in accordance with the location of the spare capacity within the network and on the traffic priority. The central facility the directs nodes, via an appropriate command, to establish the restoration route. At each node, each piece of traffic to be routed on the restoration route is uniquely identified. The unique identity of the each piece of traffic is utilized to determine the passage thereof on the restoration route to establish the continuity of the route without the need for any separate, time consuming continuity tests.

DETAILED DESCRIPTION

Figure 1:
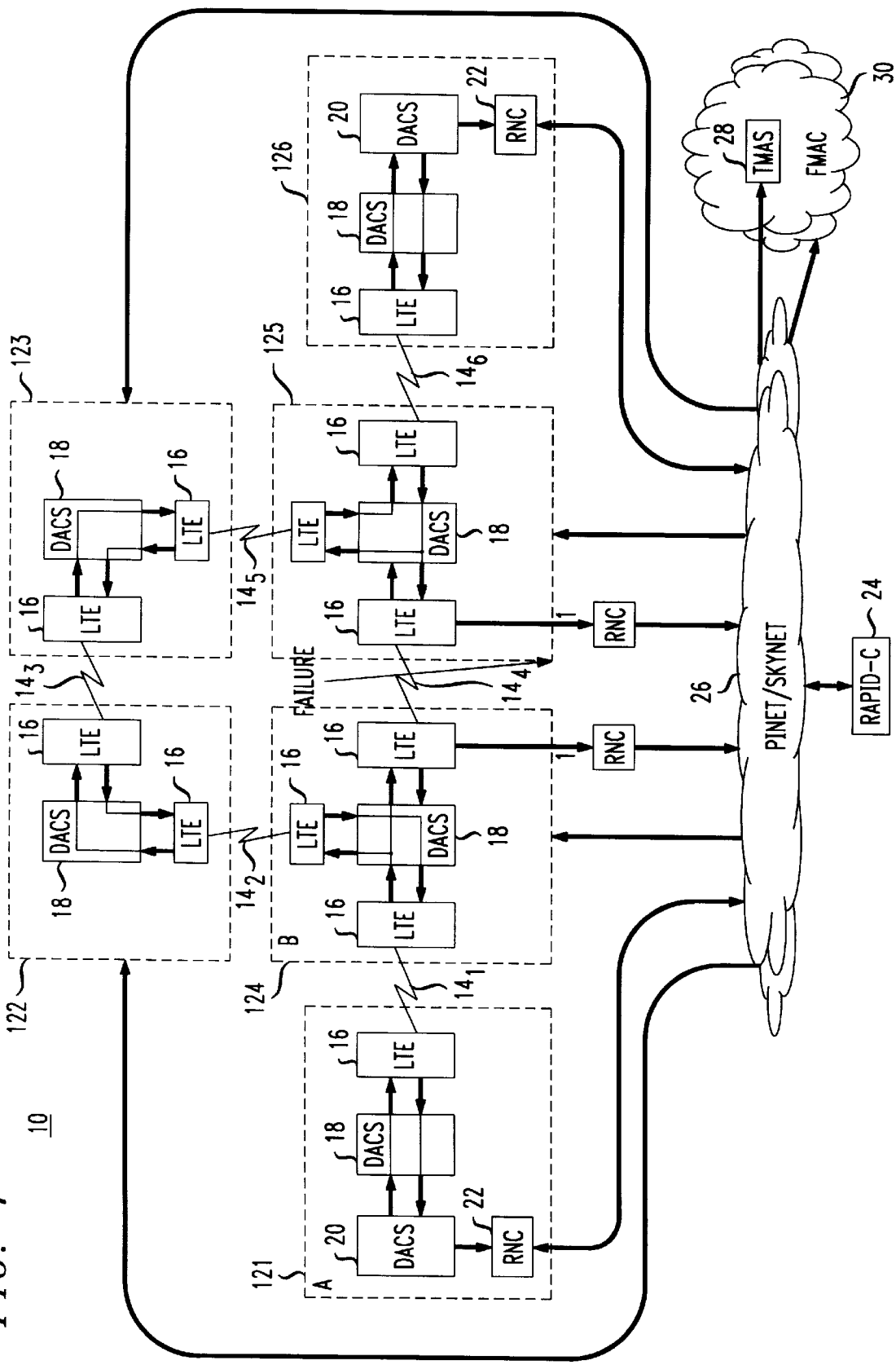
FIG. 1 is a block schematic diagram of a telecommunications network architecture in accordance with the present invention that provides for rapid restoration.

FIG. 1 illustrates a communication network 10 that achieves rapid restoration of traffic in accordance with the invention. The network 10 comprises a plurality of nodes, represented by nodes $12_1$–$12_6$. Each pair of nodes is linked by one of links $14_1$–$14_6$. In the illustrated embodiment, the node pairs are linked as indicated in Table I

TABLE I

| Node Pair | Connecting Link |
|---|---|
| $12_1$, $12_4$ | $14_1$ |
| $12_2$, $12_4$ | $14_2$ |
| $12_2$, $12_3$ | $14_3$ |
| $12_4$, $12_5$ | $14_4$ |
| $12_3$, $12_5$ | $14_5$ |
| $12_5$, $12_6$ | $14_6$ |

The number of nodes and connecting links is exemplary. As may be appreciated, the network 10 could include a larger or smaller number of nodes and links as desired.

In practice, each of links $14_1$–$14_6$ comprises a multi-channel communications transmission medium that may take the form of a multiplexed radio channel, a multiple wire-pair cable, or one or more optical fibers that each carry a multiplexed, optically formatted signal. Each of the nodes $12_1$–$12_6$ represents a communications facility such as telephone central office or network control hub. Each node includes at least one Line terminating Equipment (LTE) 16 for terminating a link coupled to the node. Thus, for example, the node $12_1$ includes a single LTE 16 since a single link $14_1$ terminates at that node, whereas the nodes $12_2$ and $12_3$ each include two LTEs 16—16 for terminating the two links, respectively, connected to these nodes. Each of the nodes $12_4$ and $12_5$ include three LTEs 16—16—16 for terminating the three links, respectively, connected to each of these nodes.

The nature of each LTE 16 depends on the nature of the link that it terminates. When the link comprises an optical fiber or set of fibers, the LTE 16 terminating such a link comprises an optical fiber interface that demultiplexes and converts the optically-formatted multiplexed signal into discrete electrical signals. Different types of LTEs terminate radio signals and the signals on a multi-pair wire cable, respectively.

Each node also includes a first Digital Access Cross–Connect System (DACS) 18 coupled to each LTE 16 associated with that node. Typically, each DACS 18 comprises a DACS III formerly manufactured by AT&T that has the ability to Cross-connect DS3 signals received at one LTE 16 to another LTE 16. For example, the DACS 18 within the node $12_4$ can Cross-connect a DS3 signal received at the LTE 16 terminating the link $14_1$ to either of the LTEs 16—16 terminating the links $14_2$ and $14_4$, respectively.

In addition, each node also includes a second DACS 20 having the capability of terminating DS3 signals and Cross-connecting and terminating T1 signals. (For ease of illustration, only the DACS 20 in each of the nodes $12_1$ and $12_6$ is illustrated, the DACS 20 of each of the other nodes being omitted for purposes of clarity.) Each DACS 20 also has the ability to receive and report an alarm signal generated upon the failure of signals received on a corresponding link, as detected via its associated LTE.

In practice, each DACS 20 comprises a model 3/1 DACS manufactured by Alcatel SA of France. In addition of providing the cross-connect and termination functions discussed above, this particular model DACS has the ability to uniquely identify each piece of traffic (i.e., each DS3 signal) that terminates at the DACS 20. As will be discussed below, this identification ability, referred to as "path identification," is utilized, in accordance with the invention, to assure path integrity without the need to perform a separate continuity test as required by the prior art.

The ability of the DACS 18 and 20 within each node to cross-connect signals between associated LTEs 16 facilitates the ability to re-route traffic in the event that a link fails. For example, assume that link $14_4$ connecting the nodes $12_5$ and $12_4$ has failed. Under such conditions, the DACS 18 and 20 within the node $12_4$ could route to node $12_2$, via link $14_2$, signals ordinarily destined for node $12_5$, via link $14_4$, but for the failure of that link. (In order to route such traffic on the link $14_2$, additional capacity must exist on that link.) Thereafter, the DACS 18 and 20 associated with the node $12_2$ would route the signals via link $14_3$ (assuming spare capacity on that link) to the node $12_3$. The DACS 18 and 20 within node $12_3$ would then route the signals via the link $14_5$ (assuming spare capacity) to the node $12_5$. In this way, the signals destined from node $12_4$ to node $12_5$ will bypass the failed link $14_4$.

Each of the nodes $12_1$–$12_6$ includes a Restoration Node Controller (RNC) 22 which gathers alarm signals from the DACS 18 and 20 as well from each LTE 16 associated with a given node. For purposes of illustration, only the RNC 22 of each of nodes $12_1$ and $12_6$ is shown, the RNCs of the other nodes being omitted for clarity. Alarm signals received by the RNC 22 associated with each node are communicated to a Restoration And Provisioning Integrated Design (RAPID) central processor 24 through a packet communication network 26 that may comprise AT&T's SKYNET wireless communications network, or a PINET, a derivative of AT&T's ACCUNET® Packet communications service. In practice, the link between the RNC 22 and the central processor 24 provided by the network 26 comprises a satellite link.

The RAPID central processor 24 is also linked to a Transport Maintenance Administration System (TMAS) 28, comprising part of a Failure Mode Analysis Center (FMAC) 30. The TMAS 28 controls those LTEs 16—16 that terminate the links comprised of one or more optical fibers. In particular, the TMAS 28 has the capability to establish protection switch lockouts for LTEs that terminate optical fibers. To achieve path restoration, the RAPID central processor 24 needs the ability to control the protection switch lock–out capability, and hence the link between the RAPID processor and the TMAS 28.

Figure 2:
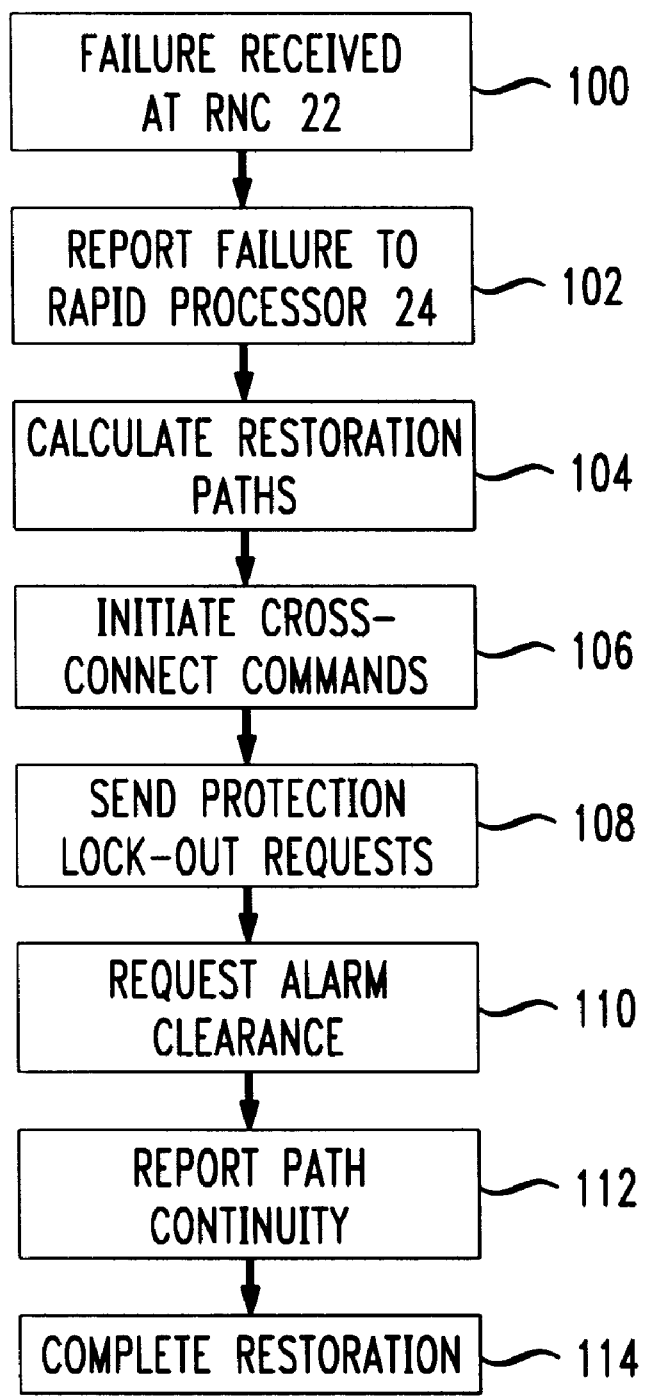
FIG. 2 is flow chart diagram of the steps undertaken in connection with restoration of the network of FIG. 1.

The process by which the RAPID central processor 24 restores the network 10 in the event of a failure is depicted in flow chart form in FIG. 2. The restoration process commences upon receipt by an RNC 22 at one of the nodes $12_1$–$12_6$ (step 100) of a failure message indicating failure of a link, LTE or a DACS. The RNC 22 reports the failure to the RAPID central processor 24 (step 102) via the network 26. Following receipt of the failure message from the reporting RNC 22, the RAPID central processor 24 then calculates the restoration path(s) (step 104). In calculating each restoration path, the RAPID central processor 24 takes into account the spare capacity, if any, on the non-failed links, as well as the traffic priority. In establishing each restoration route, the RAPID central processor 24 attempts to route high priority traffic before the low priority traffic.

Once the RAPID central processor 24 calculates the restoration path(s), the processor sends Cross-connect commands to each appropriate RNC 22 (step 106) via the network 26. In response to the cross-connect command from the RAPID central processor 24, each RNC 22 supplies a command to the appropriate one of the DACS 18 and 20 to effect the requested Cross-connections to establish each restoration path. To the extent that a restoration path includes a link comprising an optical fiber, the RAPID central processor 24 may need to send a protection lock–out request to the TMAS 28 (step 108). After initiating the cross-connect commands and the requested protection lock-outs (if necessary), the RAPID central processor 24 then requests alarm clearance of each RNC 22 that reported an alarm (step 110).

Following step 110, the RAPID central processor 24 receives a report from the RNC 22 associated with the downstream-most node of the restoration route regarding its continuity (step 112). As discussed previously, the DACS 20 within each node advantageously has the capability of uniquely identifying each DS3 signal. In this way, the DACS 20 associated with the downstream-most node can determine if a particular DS3 signal was received. From a knowledge of the identity of a particular DS3 signal launched at the origin of the restoration route, the DACS 20 associated with the downstream-most node can determine whether that particular signal traversed the restoration route. If the same signal launched at the origin of the restoration route is received at the end of the route, then the route is continuous. The failure to receive the same signal indicates a failure of continuity.

From a continuity standpoint, it is only necessary to detect the presence of a particular launched signal at the end of the restoration route. Any break or open along the restoration route will prevent the launched signal from traversing the path regardless of the location of such a break or open. However, it may be desirable to receive continuity reports from one or more intermediate RNCs 22—22 (i.e., those RNCs situated between the origin and destination nodes of the restoration route) for the purpose of determining the location of the break or open in the route in order to facilitate determination of an alternate restoration route.

Establishing continuity of the restoration path by confirming the identity of a particular DS3 signal at the downstream-most node affords a savings in time, as compared to establishing continuity by a separate continuity test, as taught in the prior art Askew et al. patent (incorporated by reference herein). In practice, the overall time required to restore 100 DS3 signals using the prior art technique embodied in the Askew et al. patent takes approximately five minutes because of the needed continuity tests. In contrast, the ability of the DACS 20 at least the downstream-most mode to establish continuity based on path identification allows 100 DS3 signals to be restored in approximately one minute, a five fold reduction over the prior art.

Assuming that path continuity is found during step 112, then the RAPID central processor 24 completes restoration by reporting the establishment of the restoration path to a Network Control Center (step 114). Note that reporting of the completion of restoration is not critical and potentially could be omitted if necessary.

The foregoing discloses a technique for restoring a communication network whereby continuity of a restoration path is established in accordance with the unique identity of signals traversing the restoration path. It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. In a communications network comprised of a plurality of nodes, each pair of nodes connected by at least one linking path that carries signals therebetween, a method for providing a restoration path between said pair of nodes upon an inability of a piece of actual traffic to pass therebetween without the need to make a separate continuity test prior to restoring traffic, the method comprising the steps of:

monitoring the network and reporting to a central facility upon the failure of a piece of actual traffic to pass between a pair of nodes;

establishing, at the central facility, a restoration route including at least one linking path, for passing traffic between said pair of nodes;

directing a command from the central facility to the nodes in the network to establish said restoration path;

uniquely identifying at a first node on the restoration path at least a piece of actual traffic to be routed on the restoration path; and determining at a second node on the restoration path whether said uniquely identified piece of actual traffic was received on the restoration path to establish the continuity of at least that portion of the restoration path between said first and second nodes without the need to make a separate continuity test prior to restoring traffic.

2. The method according to claim 1 wherein the first node is an origin node on the restoration path.

3. The method according to claim 1 wherein the second node is an end node on the restoration path.

4. The method according to claim 1 wherein a determination is made at every node other than said first node whether said uniquely identified piece of actual traffic was received.

5. The method according to claim 1 wherein the uniquely identified piece of actual traffic comprises a DS3 signal.

6. The method according to claim 1 wherein the restoration path is established by checking for any spare capacity of said linking paths and by establishing a priority for pieces of actual traffic unable to pass because of the failure.

7. The method according to claim 1 including the step of clearing each report of a failure upon the establishment of the restoration route.

8. A communications network, comprising:

a plurality of nodes;

a plurality of links, each coupling a pair of nodes for carrying signals therebetween;

cross-connect means associated with each node for routing signals received on one link coupled to a node to another link coupled to said node;

a remote node controller associated with each node for reporting a failure of the cross connect means within the node as well as a failure of any of the links connected to the node;

a central processor responsive to failure reports from each remote node controller for directing cross-connect commands via the remote node controllers to the cross connect means within the nodes to couple one link to another to establish a restoration route in the event of a failure; and means for communicating failure reports from the remote node controllers to the central processor and for communicating cross connect commands from the central processor via the remote node controllers to the cross-connect means;

WHEREIN THE IMPROVEMENT COMPRISES:

the cross-connect means associated with each of a first and second nodes on the restoration route have the ability to uniquely identify a piece of actual traffic to automatically determine the continuity of that portion of the restoration route lying between the first and second nodes.

9. The network according to claim 8 wherein the first node comprises an origin node on the restoration route.

10. The network according to claim 9 wherein the second node comprises a destination node on the restoration route.

11. The network according to claim 8 wherein each cross-connect means has the ability to uniquely identify a said piece of actual traffic.

* * * * *